(12) United States Patent
Hillmyer et al.

(10) Patent No.: US 9,051,421 B2
(45) Date of Patent: Jun. 9, 2015

(54) NANOPOROUS LINEAR POLYETHYLENE MEMBRANES AND BLOCK COPOLYMER PRECURSORS FOR SAME

(75) Inventors: Marc Hillmyer, Minneapolis, MN (US); Louis Pitet, Cody, WY (US); Mark Amendt, Dayton, OH (US)

(73) Assignee: Regents of the University of Minnesota, Minneapolis, MN (US)

( * ) Notice: Subject to any disclaimer, the term of this patent is extended or adjusted under 35 U.S.C. 154(b) by 402 days.

(21) Appl. No.: 13/634,175

(22) PCT Filed: Mar. 11, 2011

(86) PCT No.: PCT/US2011/028038
§ 371 (c)(1),
(2), (4) Date: Oct. 23, 2012

(87) PCT Pub. No.: WO2011/112897
PCT Pub. Date: Sep. 15, 2011

(65) Prior Publication Data
US 2013/0041055 A1 Feb. 14, 2013

Related U.S. Application Data

(60) Provisional application No. 61/312,922, filed on Mar. 11, 2010.

(51) Int. Cl.
| | | |
|---|---|---|
| C08J 9/26 | (2006.01) |
| C08F 255/02 | (2006.01) |
| B82Y 30/00 | (2011.01) |
| B82Y 40/00 | (2011.01) |
| C08G 63/06 | (2006.01) |
| B01D 67/00 | (2006.01) |
| B01D 71/26 | (2006.01) |

(Continued)

(52) U.S. Cl.
CPC .............. *C08G 63/06* (2013.01); *B01D 67/003* (2013.01); *B01D 71/26* (2013.01); *B01D 71/48* (2013.01); *B01D 71/76* (2013.01); *B01D 71/80* (2013.01); *C08G 2261/126* (2013.01); *H01M 2/1653* (2013.01); *H01M 8/102* (2013.01); *H01M 8/106* (2013.01); *B01D 2325/02* (2013.01); *B01D 2325/30* (2013.01)

(58) Field of Classification Search
CPC ..................................................... B01D 67/003
See application file for complete search history.

(56) References Cited

FOREIGN PATENT DOCUMENTS

| WO | WO 2009/048663 | | 4/2009 |
| WO | WO 2009048663 | A2 * | 4/2009 |

OTHER PUBLICATIONS

Schmidt, S.C.; Hillmyer, M.A. Morphological Behavior of Model Poly(ethylene-alt-propylene)-b-polylactide Diblock Copolymers. J Poly Sci B, 2002. pp. 2364-2376.*

(Continued)

*Primary Examiner* — Randy Gulakowski
*Assistant Examiner* — Christina Wales
(74) *Attorney, Agent, or Firm* — Fish & Richardson P.C.

(57) ABSTRACT

A composition comprising a block copolymer that includes at least one polyester block and at least one linear polyolefin block, wherein the composition is in the form of a nanostructured, bicontinuous composite that includes a continuous matrix phase and a second continuous phase. The continuous matrix phase comprises the linear polyolefin block of the block copolymer, and the second continuous phase comprises the polyester block of the block copolymer. The composite may be treated to remove the polyester block, thereby forming a plurality of nano-pores.

9 Claims, 14 Drawing Sheets

SEM image of a freeze-fractured surface from a sample of LEL[37–28–37] post PLA removal (Pt coating ≈ 2 nm).

(51) Int. Cl.
  B01D 71/48    (2006.01)
  B01D 71/76    (2006.01)
  B01D 71/80    (2006.01)
  H01M 2/16     (2006.01)
  H01M 8/10     (2006.01)

(56) References Cited

OTHER PUBLICATIONS

Pitet, LM.; Amendt, M.A.; Hillmyer, M.A. Nanoporous Linear Polyethylene from a Block Polymer Precursor. J Am Chem Soc 2010, 132, 8230-8231.*

Uehara, U.; Tomoyuki, Y.; Kakiage, M.; Yamanobe, T.; Komoto, T.; Nomura, K.; Nakajima, K.; Matsuda, M. Nanoporous Polyethylene Film Prepared from Bicontinuous Crystalline/Amorphous Structure of Block Copolymer Precursor. Macromolecules 2006, 39, 3971-3974.*

Ring, J.O.; Thomann, R.; Mulhaupt, R.; Raquez, J.M.; Degee, P.; Dubois, P. Controlled Synthesis and Characterization of Poly[ethylen-block-(L,L-lactide)]s by Combining Catalytic Ethylene Oligomerization with "Coordination-Insertion" Ring-Opening Polymerization. Macromol. Chem. Phys. 2007, 208, 896-902.*

Barrett et al., "The Determination of Pore Volume and Area Distributions in Porous Substances. I. Computations from Nitrogen Isotherms," *J. Am. Chem. Soc.*, 73: 373-380, 1951.

Bielawski et al., "Highly efficient syntheses of acetoxy- and hydroxy-terminated telechelic poly(butadiene)s using ruthenium catalysts containing N-heterocyclic ligands," *Polymer*, 42(11):4939-4945, 2001.

Brunauer et al., "On a Theory of the van der Waals Adsorption of Gases" *J. Am. Chem. Soc.*, 62:1723-1732, 1940.

Lu et al., "Syntheses of diblock copolymers polyolefin-b-poly(epsilon-caprolactone) and their applications as the polymeric compatilizer," *Polymer*, 46(23):10585-10591, 2005.

Nojima et al., "Composition dependence of crystallized lamellar morphology formed in crystalline—crystalline diblock copolymers," *Polymer*, 48(13):3607-3611, 2007.

Pitet and Hillmyer, "Combining Ring-Opening Metathesis Polymerization and Cyclic Ester Ring-Opening Polymerization to Form ABA Triblock Copolymers from 1,5-Cyclooctadiene and d,l-Lactide," *Macromolecules*, 42(11): 3674-3680, 2009.

Ring et al., "Controlled Synthesis and Characterization of Poly[ethylene-block-(L,L-lactide)]s by Combining Catalytic Ethylene Oligomerization with "Coordination-Insertion" Ring-Opening Polymerization," *Macromolecular Chemistry and Physics*, 208(8):896-902, 2007.

Schmidt and Hillmyer, "Morphological behavior of model poly(ethylene-alt-propylene)-b-polylactide diblock copolymers," *Journal of Polymer Science, Part B: Polymer Physics*, 40(20):2364-2376, 2002.

Uehara et al., "Nanoporous Polyethylene Film Prepared from Bicontinuous Crystalline/Amorphous Structure of Block Copolymer Precursor" *Macromolecules*, 39(12):3971-3974, 2006.

Wang and Hillmyer, "Polyethylene-poly(L-lactide) diblock copolymers: Synthesis and compatibilization of poly(L-lactide)/polyethylene blends," *Journal of Polymer Science, Part A: Polymer Chemistry*, 39(16):2755-2766, 2001.

Zalusky et al., "Ordered nanoporous polymers from polystyrene-polylactide block copolymers," *J. Am. Chem. Soc.*, 124(43):12761-12773, 2002.

International Search Report and Written Opinion for PCT/US2011/02038, mailed May 10, 2011, 11 pages.

International Preliminary Report on Patentability for PCT/US2011/028038, mailed Sep. 20, 2012, 7 pages.

* cited by examiner

Fig. 1.. Synthesis of LEL triblock polymer

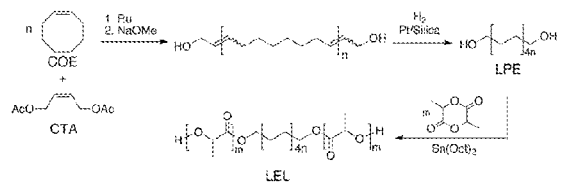

Fig. 2. Molecular and thermal characteristics for the LPE homopolymer, LEL block polymers, and porous LPE samples

| Sample ID | $M_n^a$ (kg mol$^{-1}$) | PDI$^b$ | $w_{PLA}^a$ | $f_{PLA}^c$ | $T_m^d$ °C | $T_c^d$ °C | $\Delta H_m$ J/g | $X_E^f$ % |
|---|---|---|---|---|---|---|---|---|
| *Homopolymer and Block Polymers* | | | | | | | | |
| HO–LPE–OH | 28.2 | 2.5 | 0 | 0 | 130.3 | 114.5 | 185.2 | 0.69 |
| LEL [14–28–14] | 55.7 | 2.0 | 0.50 | 0.43 | 125.9 | 109.0 | 67.7 | 0.50 |
| LEL [37–28–37] | 101.8 | 2.8 | 0.72 | 0.67 | 123.2 | 104.5 | 34.4 | 0.46 |
| *Porous LPE Polymers* | | | | | | | | |
| LEL [14–28–14] | | | | | 128.7 | 115.8 | 150.6 | 0.56 |
| LEL [37–28–37] | | | | | 130.0 | 115.5 | 158.8 | 0.59 |

(a) Calculated by $^1$H NMR spectroscopy using relative intensities of repeat unit signals and end-group signals, assuming exactly two functional groups per chain (b) determined from SEC using 1,2,4-trichlorobenzene at 135 °C compared with polystyrene standards (c) calculated using the weight fractions determined by NMR spectroscopy and the densities at 25 °C reported in (g mL$^{-1}$) of the respective components taken from the literature: PLA$^1$ = 1.25; LPE$^2$ = 0.95 (at 60% crystallinity) (d) taken as the peak of the melting endotherm (or the crystallization exotherm) during the second heat (or cool) in DSC (e) Measured by DSC as the area under the melting endotherm (f) calculated from $[\Delta H_m/(\Delta H_m^0 \cdot w_E)]$ with $\Delta H_m^0 = 277$ J g$^{-1}$ $^3$

---

[1] Witzke, D. R.; Kolstad, J. J.; Narayan, R. *Macromolecules* 1997, *30*, 7075–7085
[2] from Handbook of Polyethylene, Peacock, A. J. Marcel Dekker, Basel, Switzerland, 2000
[3] from Polymer Handbook, Brandrup, J.; Immergut, E. H.; Grulke, E. A. Eds. Wiley: New York, 1999

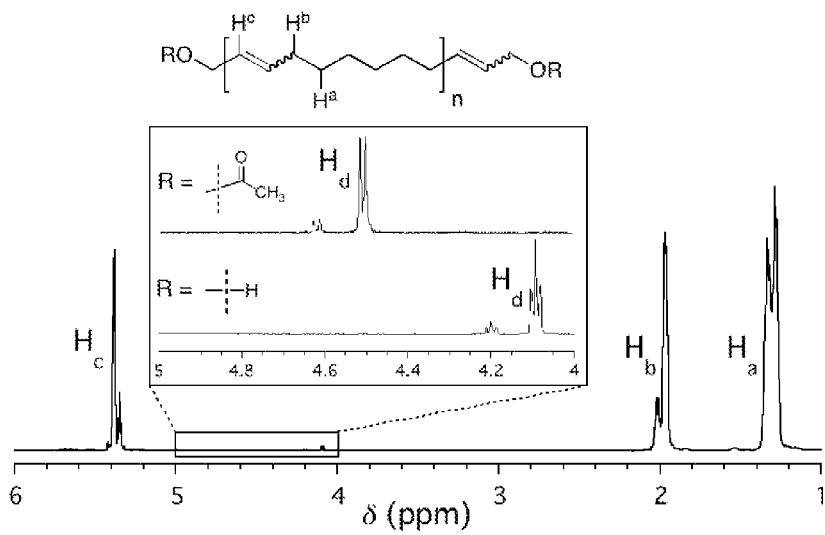

Fig. 3. $^1$H NMR spectrum of the polycyclooctene (PCOE) precursor with the two insets depicting a portion of the spectrum both (*top*) with acetoxy end-groups and (*bottom*) after hydrolysis to afford hydroxyl end-groups.

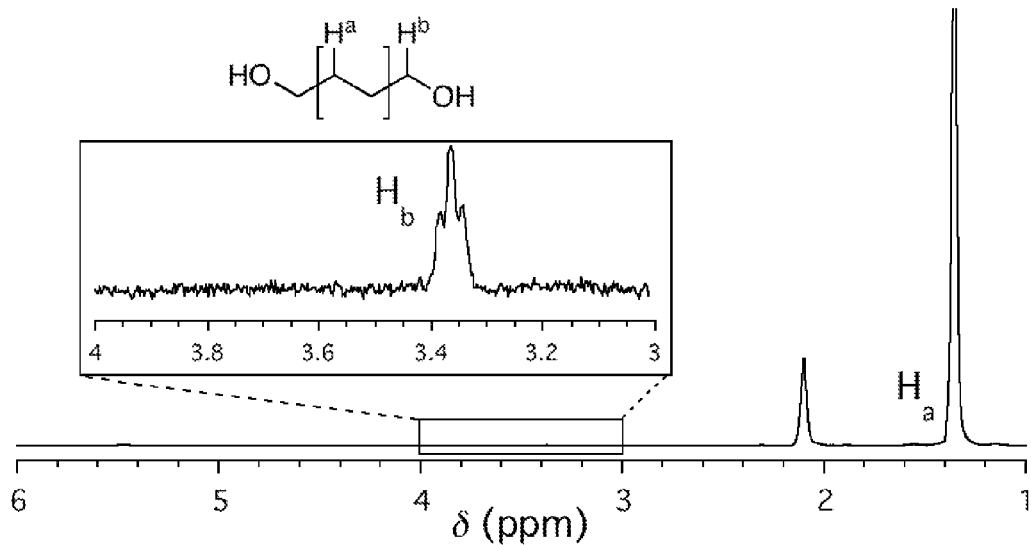

Fig. 4. $^1$H NMR spectrum of hydroxyl telechelic LPE from hydrogenation of the PCOE giving completely linear chains, with the end methylene proton signal magnified for clarity in the inset. Measured in toluene-$d_8$ at 100 °C.

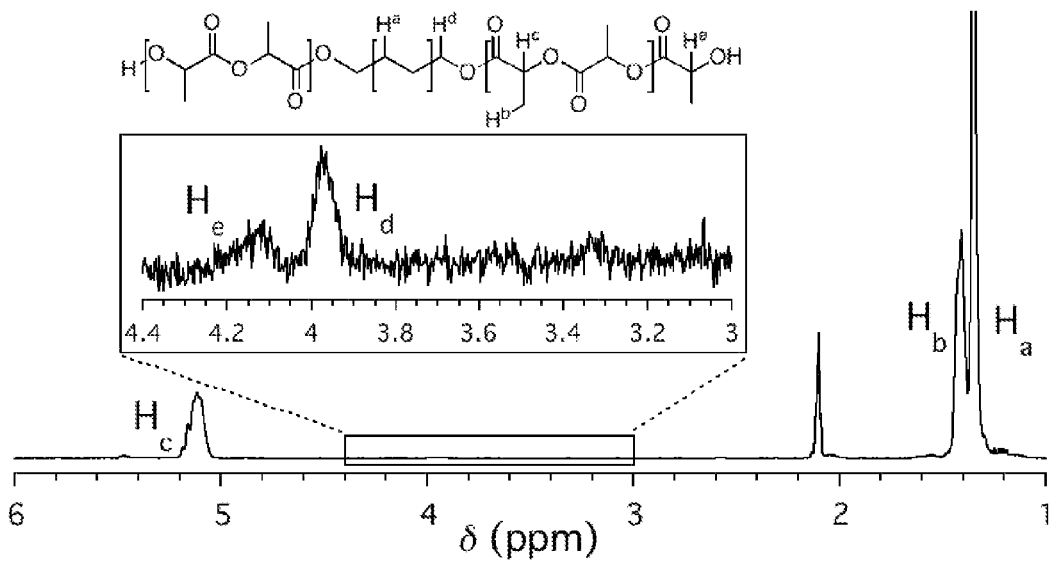

Fig. 5. $^1$H NMR spectrum of block polymer LEL [14–28–14] with the inset showing a magnified portion that accentuates the methylene protons at the junction between the two components [H$^d$; –CH$_2$–C$H_2$–O–C(O)–CH(CH$_3$)–] and the PLA end-group methine protons [H$^e$; –O–C(O)–C$H$(CH$_3$)–OH]. Measured in toluene-$d_8$ at 100 °C.

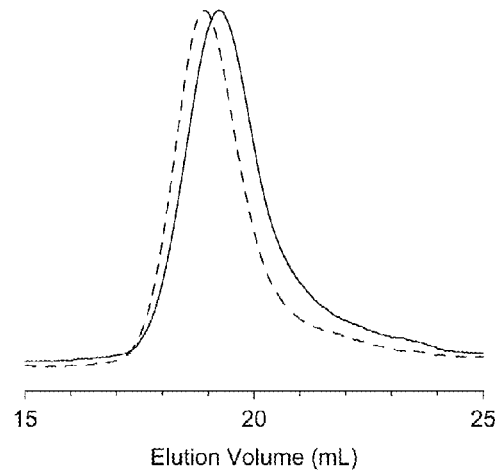

Fig. 6. Size exclusion chromatograms of the block polymers showing the difference in elution volume between LEL [14-28-14] (———) and LEL [37-28-37] (– – –).

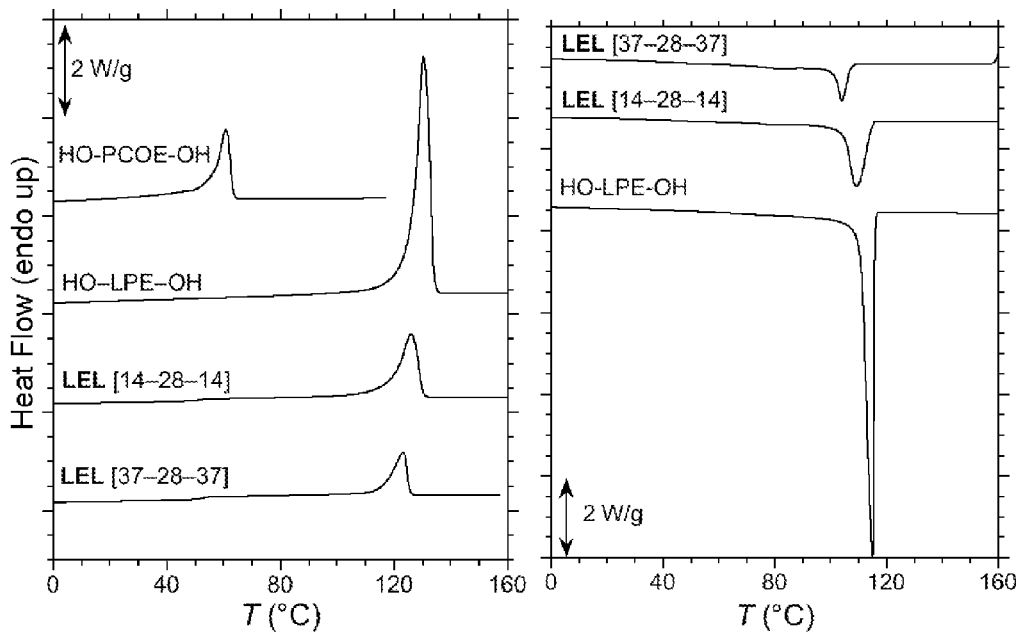
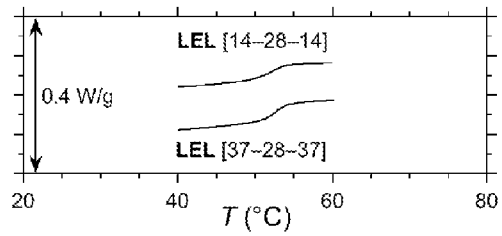

Fig. 7. (a): DSC measurements for the unsaturated PCOE precursor (HO-PCOE-OH) ($M_n$ = 27.6 kg mol$^{-1}$, PDI = 1.76), the saturated HO–LPE–OH ($M_n$ = 28 kg mol$^{-1}$, PDI = 2.5) and block polymer samples LEL [14–28–14] ($M_n$ = 55.7 kg mol$^{-1}$; $f_{PLA}$ = 0.38) and LEL [37–28–37] ($M_n$ = 102 kg mol$^{-1}$; $f_{PLA}$ = 0.62). (b): Thermograms from cooling the samples to accentuate the relative crystallization exotherm magnitudes and show the crystallization temperatures. (c): DSC thermograms accentuating the $T_g$ of the PLA in block polymer samples. Heating and cooling rates were 10 °C min$^{-1}$, and the samples were initially heated to 180 °C and isothermally annealed before analysis to homogenize thermal histories of the samples.

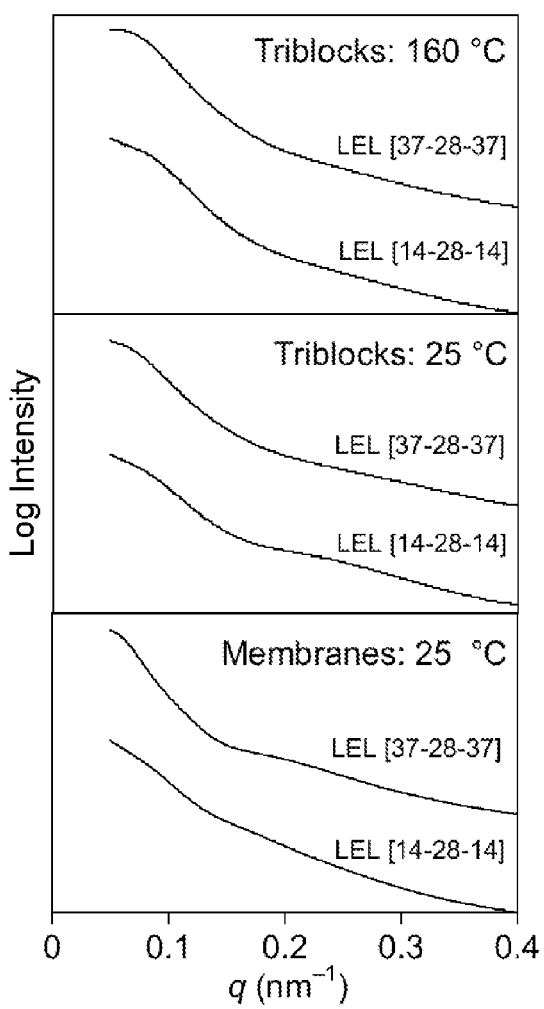

Fig. 8. SAXS analysis for the various samples showing the broad scattering reflections associated with the bicontinuous disordered structure. The primary peak appears in all cases to nestle against the beam stop at ~0.05 nm$^{-1}$. (a): Triblock copolymers in the melt at 160 °C. (b): Triblock copolymers after cooling at ~20 °C min$^{-1}$ from the melt. (c): Membranes at ambient temperature after PLA removal.

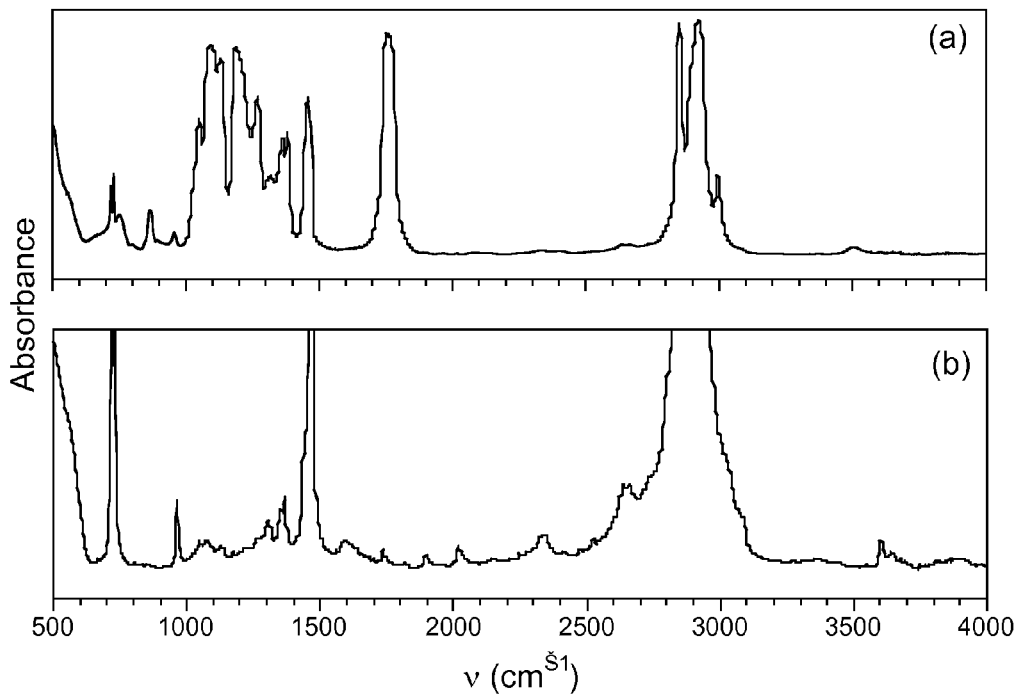
Fig. 9. Infrared spectra of the film prepared from sample LEL [37–28–37] both (a) before and (b) after removing the PLA. The characteristic signal attributed to the carbonyl functionality of the PLA ($v = 1750$ cm$^{-1}$) is clearly absent after etching, suggesting complete PLA removal.
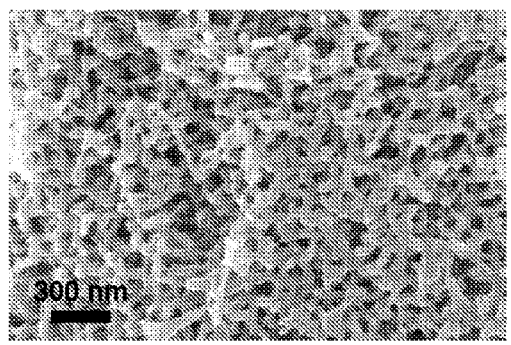
Fig. 10. SEM image of a freeze-fractured surface from a sample of LEL[37–28–37] post PLA removal (Pt coating ≈ 2 nm).

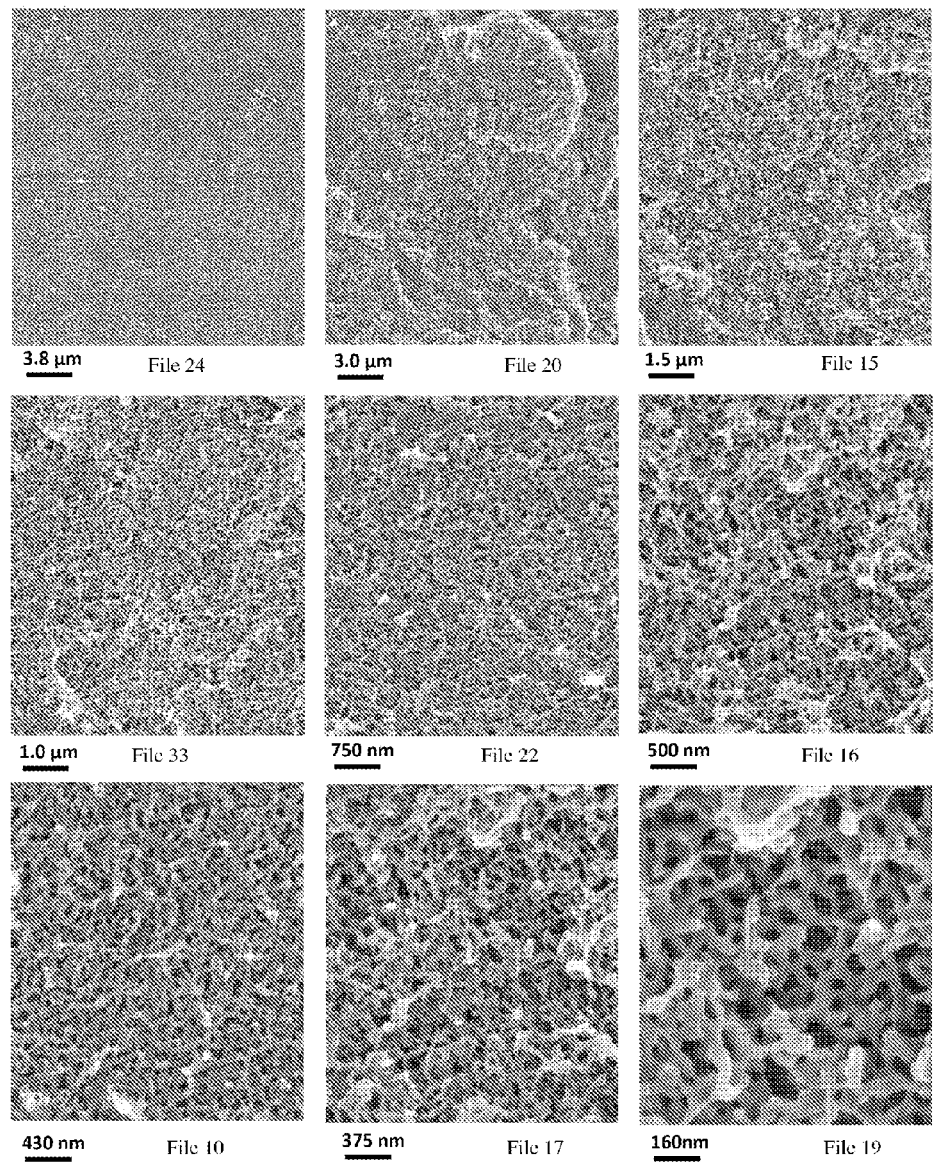
Fig. 11. SEM images at a variety of different magnifications for freeze-fractured membrane from sample LEL [37–28–37] showing the disordered bicontinuous nature of the structure where the narrow pore-size distribution and the homogeneity of the pore structure are accentuated at high and low magnification, respectively. (≈ 2 nm Pt coating)

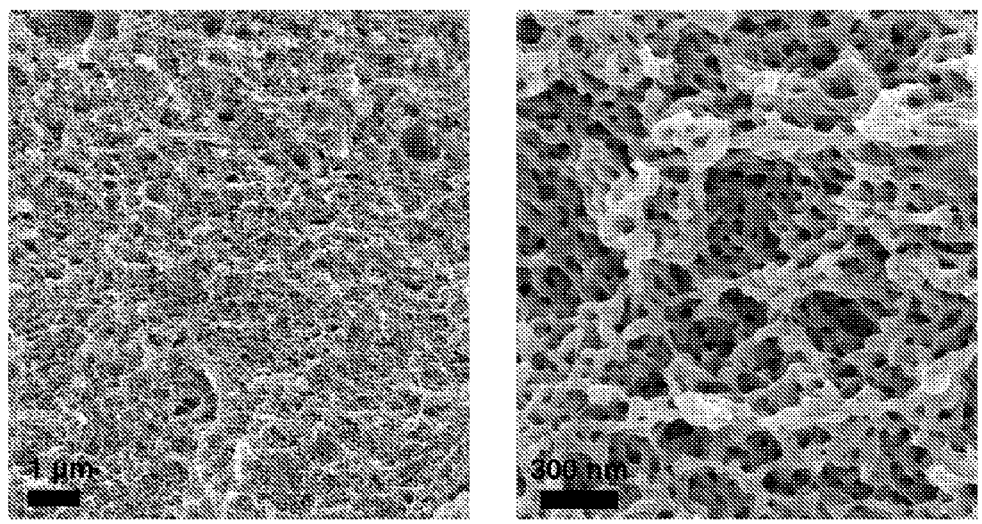
Fig. 12. SEM images from the membrane derived from sample LEL [14-28-24] showing the similarly bicontinuous disordered morphological characteristics despite the significant difference in composition compared with the other sample described. ($\approx$ 2 nm Pt coating)

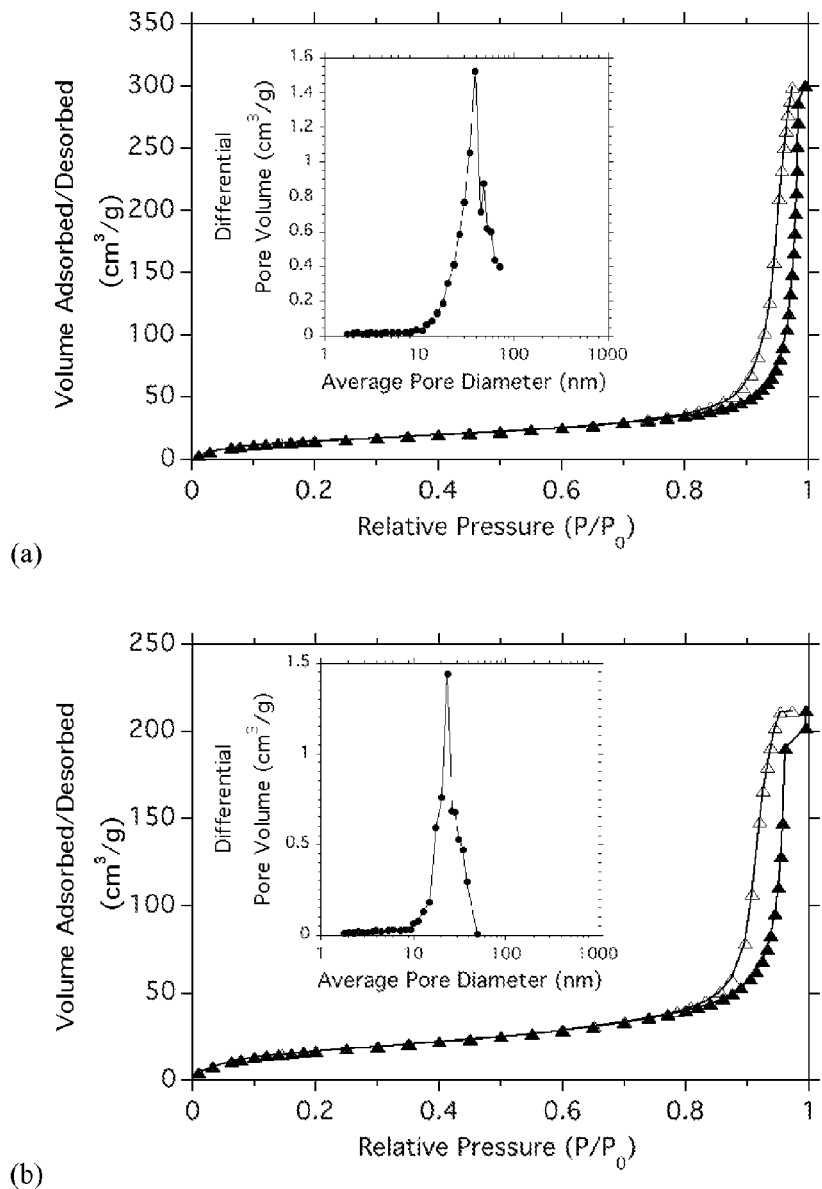
Fig. 13. Nitrogen adsorption measurements on membranes measured at T = 77K showing the adsorption (filled triangles) and desorption (empty triangles) isotherms with the inset in each plot showing the average pore size distribution calculated using the BJH method from the desorption data. (a): Membrane from LEL [37–28–37] (b): Membrane from LEL [14–28–14].

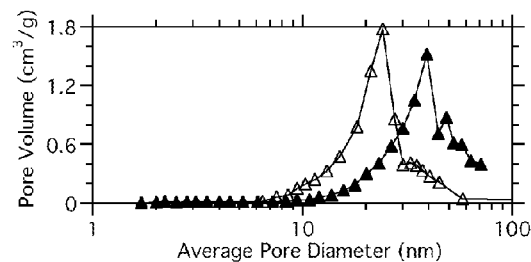
Fig. 14. Pore-size distribution for porous LPE monoliths calculated from nitrogen desorption isotherms (differential pore volume). Empty triangles: LEL[14 28 14]; Filled triangles: LEL[37 28 37].
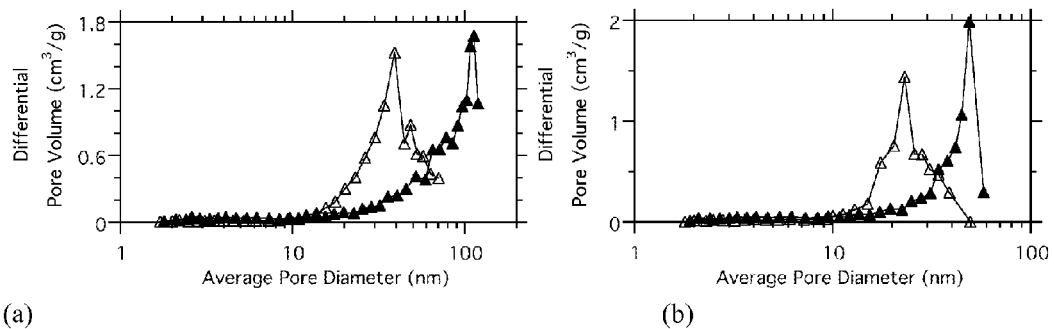
(a)                                                               (b)
Fig. 15. Pore-size distributions from nitrogen adsorption (filled triangles) and desorption (empty triangles) isotherms using the BJH method. (a): derived from LEL [37–28–37]; (b): derived from LEL [14–28–14].

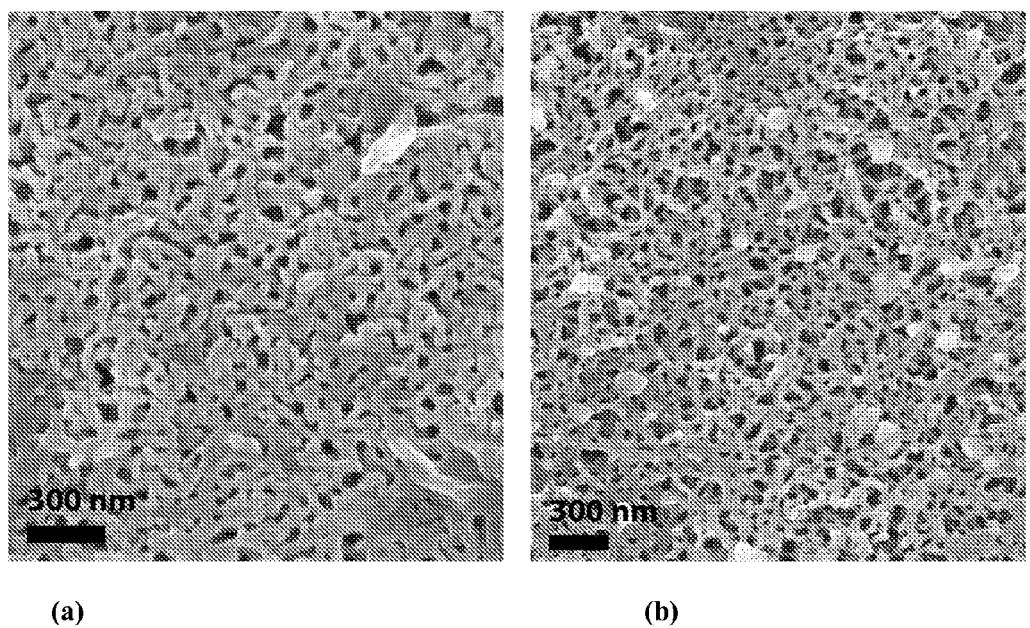
Fig. 16. SEM images of porous LPE derived from LEL films cast from 10 wt% tetralin solutions at 140 °C. (a): Derived from LEL [14–28–14]; (b): Derived from LEL [37–28–37]. ($\approx$ 2 nm Pt coating)

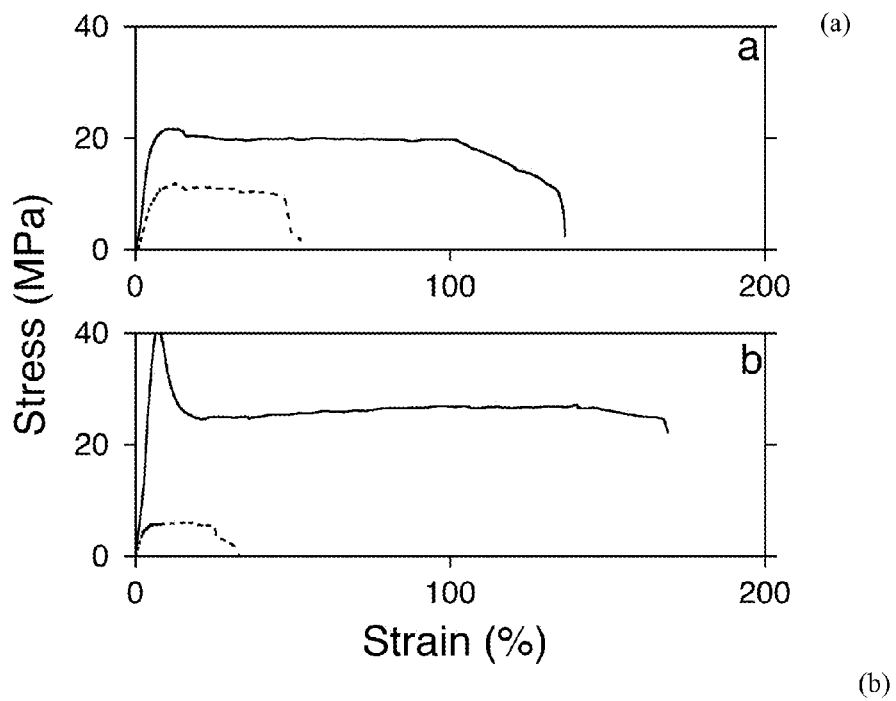
Fig. 17. Tensile testing results of block copolymer precursors (——) and membranes (- - - -) from samples (a) LEL [14–28–14] and (b) LEL [37–28–3].
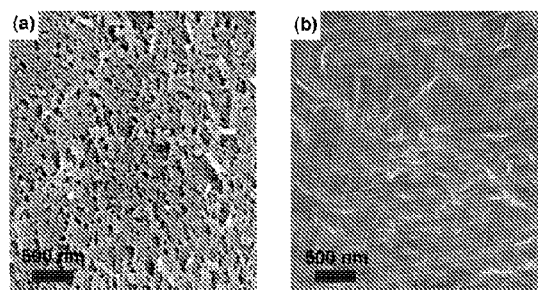
Fig. 18. SEM images for membrane derived from LEL[14–28–14] (a) before and (b) after annealing at 150°C for 5 min.

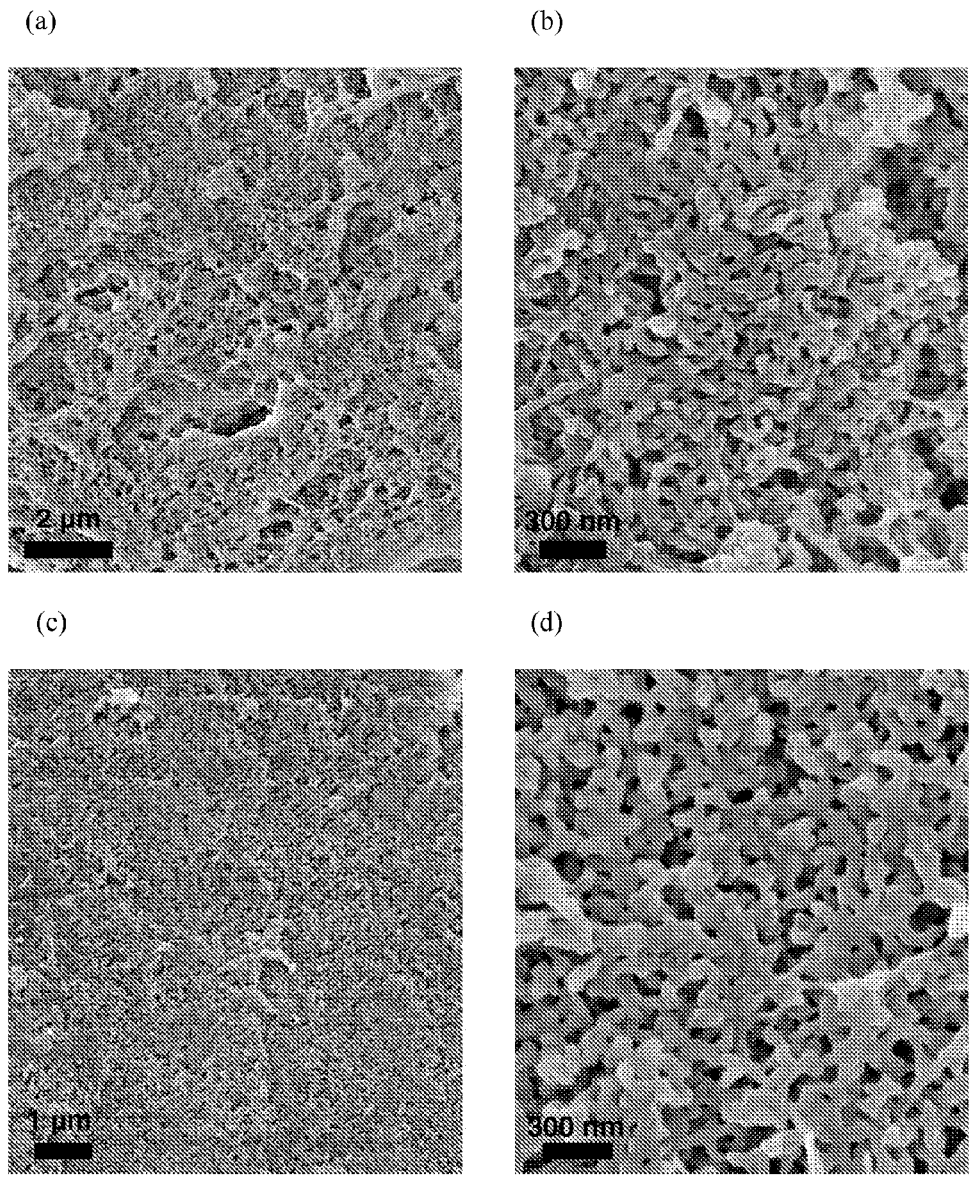
Fig. 19. SEM of surface exposed to concentrated sulfuric acid ((a) and (b)) and concentrated nitric acid ((c) and (d)) for 24 h at RT for porous sample derived from LEL [37–28–37]. The bicontinuous morphology is well-preserved. ($\approx$ 2 nm Pt coating)

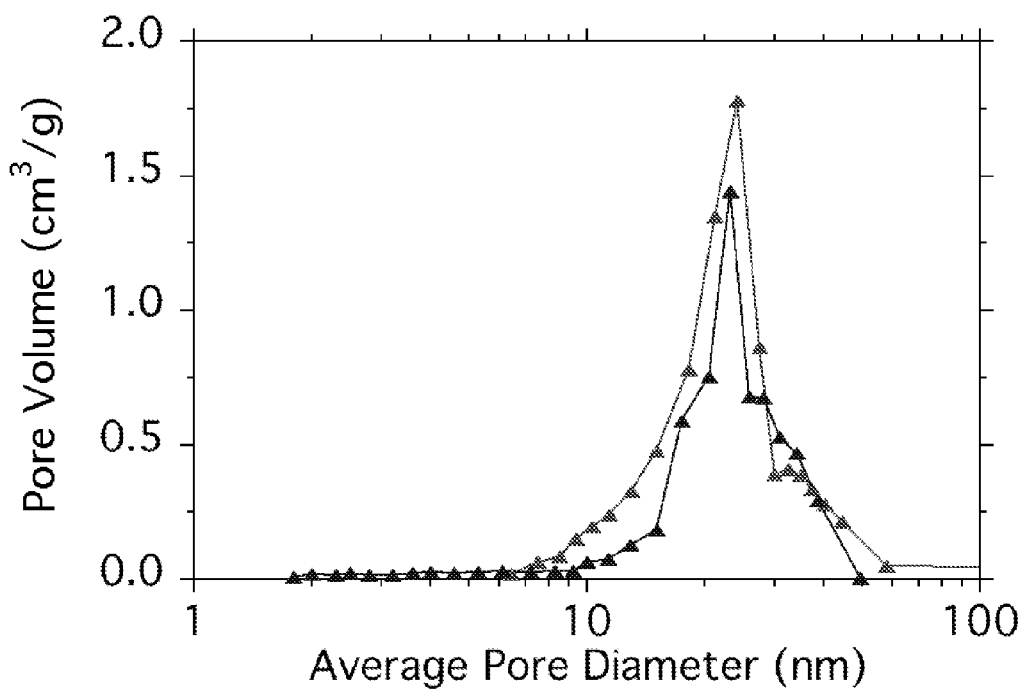
Fig. 20. Pore size distributions calculated using the BJH method from desorption isotherms for the membrane from LEL [14–28–14] before (a) and after (b) soaking in concentrated hydrochloric acid at 50 °C for 24 h. The overall pore size distribution is minimally affected.

NANOPOROUS LINEAR POLYETHYLENE MEMBRANES AND BLOCK COPOLYMER PRECURSORS FOR SAME

STATEMENT OF FEDERALLY SPONSORED RESEARCH

This invention was made with government support under DMR-0605880 awarded by the National Science Foundation. The government has certain rights in the invention.

CROSS-REFERENCE TO RELATED APPLICATIONS

This application is a National Stage application under 35 U.S.C. §371 of International Application No. PCT/US2011/028038 having an International Filing Date of Mar. 11, 2011, which claims the benefit of priority of U.S. Provisional Application Ser. No. 61/312,922 having a filing date of Mar. 11, 2010.

TECHNICAL FIELD

This invention relates to polymer membranes and processes for preparing same.

BACKGROUND

Block copolymers are versatile hybrid materials that have been used in the preparation of a wide variety of nano-structured materials. The incompatibility of distinct chemical segments leads to nanometer-scale self-organization, and thus utility as structure directing agents.

SUMMARY

In one general aspect, a process for preparing a polymer composite is described that includes reacting a hydroxyl-terminated, linear polyolefin polymer with a cyclic ester in the presence of a ring opening catalyst to form a block copolymer having at least one polyester block and at least one linear polyolefin block. The block copolymer is in the form of a nano-structured, bicontinuous composite. The composite includes a continuous matrix phase and a second continuous phase, where the continuous matrix phase comprises the linear polyolefin block of the block copolymer, and the second continuous phase comprises the polyester block of the block copolymer.

As used herein, a "nano-structured, bicontinuous composite" refers to a polymer-polymer composite characterized by two continuous polymer phases interspersed throughout each other that exhibits compositional heterogeneity on a nanometer (i.e., 1-500 nanometer) length scale.

In various implementations, the process may include treating the composite to selectively remove the polyester blocks of the block copolymer in the second continuous phase to form a plurality of pores. The composite may be treated by a chemical etchant. The pores may have an average pore diameter of about 1 to about 500 nanometers. The pores may also have an average pore diameter of about 10 to about 50 nanometers. In some embodiments, the resultant composite is in the form of a nano-porous membrane that may be a battery separator or water purification membrane.

Examples of suitable polyolefins include polyethylene and polypropylene. Examples of suitable cyclic esters include D,L-lactide, glycolide, caprolactone, menthide, and dihydrocarvide. When the cyclic ester is D,L-lactide, the resulting triblock copolymer includes polylactide blocks.

In another general aspect, a composition is described that includes a block copolymer that includes at least one polyester block and at least one linear polyolefin block in the form of a nano-structured, bicontinuous composite that includes a continuous matrix phase and a second continuous phase. The continuous matrix phase includes the linear polyolefin block of the block copolymer, and the second continuous phase comprises the polyester block of the block copolymer. Examples of suitable polyolefins include polyethylene and polypropylene. Examples of suitable polyesters include polylactide. The composition exhibits good mechanical properties, including modulus, tensile strength, and elongation at break.

In another general aspect, a composition is described that includes a nano-structured, bicontinuous composite having a continuous matrix phase comprising a linear polyolefin and a second continuous phase comprising a plurality of nanopores. The pores may have an average pore diameter of about 1 to about 500 nanometers. The pores may also have an average pore diameter of about 10 to about 50 nanometers. In some embodiments, the composition is in the form of a nano-porous membrane that may be a battery separator or water purification membrane. The polyolefin can be polyethylene or propylene.

The details of one or more embodiments of the invention are set forth in the accompanying drawings and the description below. Other features, objects, and advantages will be apparent from the description and from the claims.

DESCRIPTION OF DRAWINGS

FIG. 1 shows a reaction scheme for synthesizing a polylactide-linear polyethylene-polylactide (LEL) triblock copolymer.

FIG. 2 is a table reporting the molecular and thermal characteristics for the linear polyethylene (LPE) homopolymer, LEL triblock copolymers, and porous LPE samples prepared according to the Examples described herein.

FIG. 3 is a 1H NMR spectrum of the polycyclooctene (PCOE) precursor used to prepare the LEL triblock copolymers, with the two insets depicting a portion of the spectrum both with acetoxy end-groups (top) and hydrolysis (bottom) to afford hydroxyl end-groups.

FIG. 4 is a $^1$H NMR spectrum of hydroxyl telechelic LPE from hydrogenation of the PCOE, giving completely linear chains, with the end methylene proton signal magnified for clarity in the inset. Measured in toluene-$d_8$ at 100° C.

FIG. 5 is a $^1$H NMR spectrum of block polymer LEL [14-28-14] with the inset showing a magnified portion that accentuates the methylene protons at the junction between the two components [$H^d$; —$CH_2$—$CH_2$—O—C(O)—CH($CH_3$)—] and the PLA end-group methine protons [$H^e$; —O—C(O)—CH($CH_3$)—OH]. Measured in toluene-$d_8$ at 100° C.

FIG. 6 depicts size exclusion chromatograms of the block polymers showing the difference in elution volume between LEL [14-28-14] (—) and LEL [37-28-37] (- - -).

FIG. 7(a) presents DSC measurements for the unsaturated PCOE precursor (HO-PCOE-OH) ($M_n$=27.6 kg mol$^{-1}$, PDI=1.76), the saturated HO-LPE-OH ($M_n$=28 kg mol$^{-1}$, PDI=2.5) and triblock polymer samples LEL [14-28-14] ($M_n$=55.7 kg mol$^{-1}$; $f_{PLA}$=0.38) and LEL [37-28-37] ($M_n$=102 kg mol$^{-1}$; $f_{PLA}$=0.62).

FIG. 7(b) presents thermograms from cooling the samples to accentuate the relative crystallization exotherm magnitudes and show the crystallization temperatures.

FIG. 7(c) presents DSC thermograms accentuating the $T_g$ of the PLA in block polymer samples. Heating and cooling rates were 10° C. min$^{-1}$, and the samples were initially heated to 180° C. and isothermally annealed before analysis to homogenize thermal histories of the samples.

FIGS. 8(a)-(c) present SAXS analysis for the various samples showing the broad scattering reflections associated with the bicontinuous disordered structure. The primary peak appears in all cases to nestle against the beam stop at ~0.05 nm$^{-1}$. FIG. 8(a): triblock copolymers in the melt at 160° C. FIG. 8(b): triblock copolymers after cooling at ~20° C. min$^{-1}$ from the melt. FIG. 8(c): membranes at ambient temperature after PLA removal.

FIGS. 9(a) and (b) present infrared spectra of the film prepared from sample LEL [37-28-37] both (a) before and (b) after removing the PLA. The characteristic signal attributed to the carbonyl functionality of the PLA ($v$=1750 cm$^{-1}$) is clearly absent after etching, suggesting complete PLA removal.

FIG. 10 is a scanning electron microscopy (SEM) microphotograph of a freeze-fractured LEL film after PLA etching (the length scale bar represents 300 nm). Surfaces were sputter coated with platinum to prevent charging.

FIG. 11 presents SEM images at a variety of different magnifications for freeze-fractured membrane from sample LEL [37-28-37] showing the disordered bicontinuous nature of the structure where the narrow pore-size distribution and the homogeneity of the pore structure are accentuated at high and low magnification, respectively. (≈2 nm Pt coating).

FIG. 12 presents SEM images from the membrane derived from sample LEL [14-28-24] showing the similarly bicontinuous disordered morphological characteristics despite the significant difference in composition compared with the other sample described. (≈2 nm Pt coating).

FIGS. 13(a)-(b) represent nitrogen adsorption measurements on membranes measured at T=77K showing the adsorption (filled triangles) and desorption (empty triangles) isotherms with the inset in each plot showing the average pore size distribution calculated using the BJH method from the desorption data. FIG. 13(a): membrane from LEL [37-28-37]. FIG. 13(b): membrane from LEL [14-28-14].

FIG. 14 is a graph illustrating the pore size distribution for two different LEL films (LEL [37-38-37] (filled triangles) and LEL [14-28-14] (empty triangles)) after PLA etching calculated from nitrogen desorption isotherms.

FIGS. 15(a)-(b) are graphs illustrating pore-size distributions from nitrogen adsorption (filled triangles) and desorption (empty triangles) isotherms using the BJH method. FIG. 15(a) is derived from LEL [37-28-37]. FIG. 15(b) is derived from LEL [14-28-14].

FIGS. 16(a)-(b) are SEM images of porous LPE derived from LEL films cast from 10 wt % tetralin solutions at 140° C. FIG. 16(a) is derived from LEL [14-28-14]. FIG. 16(b) is derived from LEL [37-28-37]. (~2 nm Pt coating).

FIGS. 17(a)-(b) are stress-strain curves representing the results of tensile testing of block copolymer precursors (—) and membranes ( - - - ) from samples LEL [14-28-14] (FIG. 17(a)) and LEL [37-28-37] (FIG. 17(b)).

FIGS. 18(a) and (b) are SEM microphotographs corresponding to a freeze-fractured LEL [14-28-14] film after PLA etching (the length scale bars represent 500 nm). FIG. 18(a) corresponds to the film prior to annealing, and FIG. 18(b) corresponds to the film after annealing at 150° C. for 5 minutes.

FIGS. 19(a)-(d) are SEM microphotographs of surfaces exposed to (top, left and right) concentrated sulfuric acid (FIGS. 19(a) and (b)) and concentrated nitric acid for 24 h at RT (FIGS. 19(c) and (d)) for porous sample derived from LEL [37-28-37]. The bicontinuous morphology is well-preserved. (~2 nm Pt coating)

FIG. 20 is a graph illustrating pore size distributions calculated using the BJH method from desorption isotherms for the membrane from LEL [14-28-14] before (curve (a)) and after (curve (b)) soaking in concentrated hydrochloric acid at 50° C. for 24 h. The overall pore size distribution is minimally affected.

DETAILED DESCRIPTION

Polymer composites are prepared generally according to the reaction scheme shown in FIG. 1. The nano-structured nature of the composite results in films that exhibit good mechanical properties, including modulus, tensile strength, and ultimate elongation, that make them useful in a variety of applications.

The polyester blocks (e.g., polylactide blocks) are incompatible with the linear polyolefin block (e.g., polyethylene block). The incompatibility results in microphase at some point after the block copolymer synthesis from the initial homogeneous state, and creating a multi-phase composite having a nano-structured, bicontinuous microstructure in which one of the phases includes the polyester blocks.

In some embodiments, the polyester blocks may be selectively removable, e.g., by chemically etching using base or acid. Removal creates a plurality of nano-sized pores. The pores are small (e.g., pore diameters on the order of about 1 to about 500 nanometers, or about 10 to about 50 nanometers). In addition, the pores are characterized by a relatively narrow size distribution, and are substantially homogeneously distributed throughout the film. These features make the nanoporous film particularly useful for applications such as separation membranes (e.g., battery separators). In general, the films are useful in a variety of applications, including separation membranes (e.g., battery separators), membranes for water purification, fuel cell membranes, catalytic reactors, nanotemplates, and the like. The nanoscopic, bicontinuous structure that results from the aforementioned process contains interpenetrating domains that both percolate through the entire material. This co-continuity allows for one mechanically robust phase to support the entire structure and another percolating domain that endows the material with some specific functionality. Generating a nanoporous structure by removal of the functional domain gives a material with a percolating pore structure. Since the pore size distribution is narrow and the pore structure permeates the entire film, such membrane materials are useful as battery separators.

EXAMPLES

Materials

All bulk solvents were purchased from Mallinkrodt and used as received unless otherwise specified. Tetralin was purchased from TCI Chemicals and was vacuum distilled prior to use. The second generation Grubbs catalyst was purchased from Aldrich and used as received. Both cis-cyclooctene from Acros (95%) and cis-1,4-diacetoxy-2-butene from TCI Chemical (95%) were distilled over CaH$_2$ prior to polymerizations. Tetrahydrofuran (THF) and toluene were passed through alumina columns and thoroughly degassed. Purac provided the D,L-lactide (99%), which was recrystallized twice from toluene prior to being stored in a glove box under N₂ atmosphere. Sn(Oct)₂ from Aldrich was distilled using a Kugelrohr apparatus and stored under N₂. The catalyst used in hydrogenation reactions was a silica-supported Pt catalyst supplied from Dow Chemical Company.

Characterization

¹H NMR spectra obtained using CDCl₃ as a solvent were measured on a Varian Inova 500 operating at 500 MHz, whereas those in toluene-d₈ solvent were measured on a Varian Inova VI-300 operating at 300 MHz with variable temperature capability up to 100° C. Size-exclusion chromatography (SEC) analysis was performed on two different instruments, depending on the relative solubility of the materials and temperature capabilities of the instruments. Operating at a flow rate of 1.0 mL min⁻¹ and 35° C. is a Hewlett-Packard (Agilent Technologies) 1100 Series liquid chromatograph housing three PlGel 5 μm Mixed-C (Polymer Laboratories) columns with pore sizes of 500 Å, 1×10³, and 1×10⁴ Å with chloroform as eluent. The refractive index signal was recorded with a Hewlett Packard 1047A refractive index detector. The other instrument, operating at a flow rate of 1.0 mL min⁻¹ and 135° C. with 1,2,4-trichlorobenzene as eluent, is a Polymer Laboratories GPC-220 liquid chromatograph holding three PlGel 10 μm Mixed-B columns and equipped with a refractometer used for samples with saturated polyethylene portions.

Small-angle X-ray scattering experiments were performed at the Advanced Photon Source (APS) at Argonne National Laboratories at Sector 5-ID-D beamline. The beamline is maintained by the Dow-Northwestern-Dupont Collaborative Access Team (DND-CAT). The source produces X-rays with a wavelength of 0.84 Å. The sample to detector distance was 5.65 m and the detector radius is 81 mm. Scattering intensity was monitored by a Mar 165 mm diameter CCD detector with a resolution of 2048×2048. The two-dimensional scattering patterns were azimuthally integrated to afford one-dimensional profiles presented as spatial frequency (q) versus scattered intensity.

Differential scanning calorimetric (DSC) measurements were obtained using a DSC Q-1000 calorimeter from TA Instruments that was calibrated with an indium standard. Samples were loaded into hermetically sealed aluminum pans prior to analysis. The thermal history of the samples were all erased by heating the samples to 180° C. and isothermally annealing for 5 min. The samples were then cooled at 10° C. min⁻¹ to −120° C. followed by a second heating cycle to 180° C. at a rate of 10° C. min⁻¹, all under a helium purge. Melting enthalpies were evaluated by integration of the melting endotherm using TA Universal Analysis software.

Scanning electron microscopy (SEM) was performed on a Hitachi S-900 FE-SEM operating at 3.0 kV accelerating voltage. Samples were prepared by fracturing small pieces of the films immediately after submerging in liquid N₂. Before imaging, the samples were coated with platinum using a VCR high-resolution indirect ion-beam sputtering system. The samples were coated for 10 min depositing approximately 2 nm of platinum.

Nitrogen adsorption/desorption was carried out at 77 K using an Autosorb-1 system. The specific surface area of the membranes was calculated using the Brunauer-Emmet-Teller method (Brunauer, S.; Deming, L. S.; Deming, W. E.; Teller, E. J. *J. Am. Chem. Soc.* 1940, 62, 1723-1732), while the pore-size distributions were determined using the Barret-Joyner-Halenda model (Barrett, E. P.; Joyner, L. G.; Halenda, P. P. *J. Am. Chem. Soc.* 1951, 73, 373-380).

General Procedure for Synthesis of HO-LPE-OH Macroinitiator

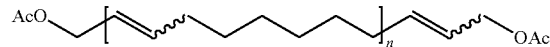

The procedure for preparing hydroxy-telechelic polyolefins by ring-opening metathesis polymerization is generally described in (a) Bielawski, C. W.; Scherman, O. A.; Grubbs, R. H. *Polymer* 2002, 42, 4939-4045, and (b) Pitet, L. M.; Hillmyer, M. A. *Macrmolecules* 2009, 42, 3674-3680. Briefly, 0.25 g (0.23 mL; 1.45 mmol) of the chain transfer agent (CTA) cis-1,4-diacetoxy-2-butene was transferred to an air-free flask through a rubber septum along with 180 mL of THF. This mixture was rapidly stirred and the temperature was maintained at 35° C. Using a syringe pump, 40 g (47 mL; 363 mmol) of cis-cyclooctene were added to the mixture over 1.5 h. Shortly (~5 min) after starting the gradual monomer addition, 15 mg (18 μmol) of Grubbs 2$^{nd}$ Generation catalyst was added as a solution in 1 mL THF. After 6 h, the reaction contents were slowly poured into 2 L of cold MeOH made slightly acidic with 20 mL of 1M HCl (aq). The precipitated polymer was isolated and dried under reduced pressure at 40° C. for 2 days.

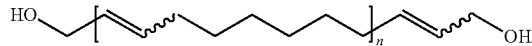

The entire yield was dissolved into 200 mL of THF and stirred at 0° C. for 6 h after adding 10 mL of a 0.7 M solution of NaOMe in MeOH (7 mmol NaOMe). The polymer solution was again precipitated into 2 L of slightly acidic MeOH, isolated, and dried for 2 days, yielding 37.5 g (94%). ¹H NMR (CDCl₃, 25° C.): δ 5.40 (m, (E)-CH=CHCH₂CH₂—, backbone), 5.35 (m, (Z)—CH=CHCH₂CH₂—, backbone), 4.20 (t, (Z)—CH=CHCH₂OH), 4.10 (t, (E)-CH=CHCH₂OH), 2.05 (Z)—CH=CHCH₂CH₂— backbone), 1.95 (m, (E)-CH=CHCH₂CH₂ backbone), 1.30 (m, (Z)—CH=CHCH₂CH₂— backbone).

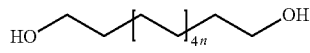

The hydroxy-telechelic PCOE (HO-PCOE-OH) (10.0 g; 45.4 mmol double bonds) was dissolved in 150 mL cyclohexane and the solution was purged with bubbling argon for 20 minutes. A silica supported Pt/Re catalyst (1.0 g of 10%) was placed in the high-pressure reactor, which was sealed, evacuated of air, and refilled with Ar. The polymer solution was added to the reactor at which point hydrogen was introduced (500 psig) and the temperature increased to 90° C. The reaction mixture was stirred for 24 hours, after which the solvent was removed and replaced with 150 mL toluene. The catalyst was removed by filtering the solution at 110° C. and the solvent was again evaporated to afford 8.2 g of HO-LPE-OH (82% yield). ¹H NMR (toluene-d₈, 100° C.): δ 3.37 (t, —CH₂OH), 1.35 (s, —CH₂—, backbone).

General Procedure for Synthesis of LEL Triblock Polymers

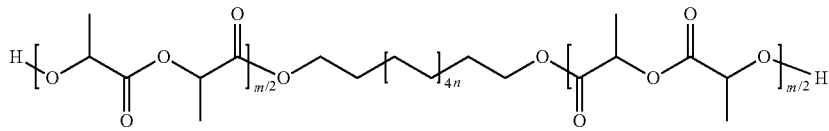

The synthesis of one triblock is described, which is representative of all samples where the D,L-lactide feedstock was adjusted accordingly to target the desired polymer compositions. The concentration of LA was kept constant at 1 M. HO-LPE-OH (2.0 g; 0.14 mmol OH) was placed with a stir-bar in a pressure vessel fitted with a Teflon screw-cap and Viton o-ring seal. This was transferred to a glove box, wherein D,L-lactide (2.5 g; 17 mmol), toluene (17 mL) and Sn(Oct)$_2$ (7 mg; 17 µmol) were added before sealing and removing from the box. The flask was immersed in an oil-bath at 110° C. for 6 h followed by precipitation into a ten-fold excess by volume of MeOH. The isolated polymer was dried at 60° C. for 24 h to yield 4.2 g (93%). $^1$H NMR (toluene-d$_8$, 100° C.): δ 5.10 (bm, —C(O)CH(CH$_3$)O—backbone), 4.05-4.25 (m, —C(O)CH(CH$_3$)OH), 3.70-4.00 (m, —H=CHCH$_2$OC(O)CH(CH$_3$)O—) 1.40-1.45 (—C(O)CH(CH$_3$)O— backbone), 1.30-1.40 (—CH$_2$—, backbone).

General Procedure for Preparation of Block Copolymer Films and Nanoporous Membranes.

The block copolymers were cast as films in aluminum pans by first dissolving the polymer as a 10% solution in tetralin at 140° C. The hot solution was transferred to the aluminum pan and the high temperature was maintained while the solvent slowly evaporated over 2 h. This was initially done to attempt to adopt an equilibrium microphase separated structure. The dry polymer film was kept at 140° C. for an additional 4 h. The polymer films stuck to the aluminum. They were separated by dissolving the aluminum in a 4 M solution of HCl (aq). Melt-pressing of the block polymer precursors into cylindrical discs was done in a hot press using molds with 13 mm diameter and 1 mm thickness.

The porous samples were prepared by submerging pieces of the block polymer (either bulk melt-pressed or solvent cast) in a 0.5 M NaOH solution in 40% (aq) MeOH. The solutions were kept at 70° C. for 3 days and the porous pieces were washed with slightly acidic MeOH (aq) and then pure MeOH and further dried for 2 days at 60° C. in vacuo. Subsequent mechanical testing was performed on the solvent-cast films.

Results

The molecular and thermal characteristics for the LPE homopolymer, LEL block copolymers, and porous LPE samples, prepared as described above, are set forth in FIG. 2. A $^1$H NMR spectrum of the polycyclooctene precursor (PCOE) is shown in FIG. 3. A $^1$H NMR spectrum of the hydroxyl telechelic LPE from hydrogenation of the PCOE is shown in FIG. 4. A 1H NMR spectrum of triblock copolymer LEL [14-28-14] is shown in FIG. 5. Size exclusion chromatograms of LEL [14-28-14] and LEL [37-28-37] are shown in FIG. 6.

A sample of LEL [37-28-37] was compression molded at 160° C. SAXS analysis (FIGS. 8(a)-(c)) at 160° C. showed a broad signal with a maximum at 0.06 nm$^{-1}$ (d=105 nm) with no discernable higher-order reflections consistent with a microphase separated structure lacking long range order. The high degree of incompatibility between LPE and PLA, combined with low entanglement molecular weight for LPE, hinder the adoption of a well-organized mesophase. Annealing the samples up to 72 h at 160° C. did not appreciably increase the level of organization. Cooling from the melt to ambient temperature results in crystallization of the LPE phase (FIGS. 7(a)-7(c)). SAXS analysis for either sample at 25° C. (FIGS. 8(a)-(c)) gave virtually indistinguishable profiles compared to the 160° C. data, which is indicative of confined LPE crystallization and consistent with behavior of other block polymers of polyethylene (i.e., hPB) and a highly incompatible component.

Exposure of molded LEL [37-28-37] samples to a 0.5 M solution of NaOH selectively removed the PLA, as confirmed gravimetrically and by IR spectroscopy (FIGS. 9(a)-(b)). An interconnected LPE scaffold with a disorganized pore structure was observed by scanning electron microscopy (SEM) (FIGS. 10-11). Etched LEL [14-28-14] samples show a similarly disordered bicontinuous morphology (FIG. 12) after PLA removal despite containing significantly less PLA as compared to LEL [37-28-27].

Nitrogen adsorption analysis of nanoporous membranes derived from both samples showed type IV adsorption/desorption isotherms indicative of mesoporosity (FIGS. 13(a) and (b)). Narrow pore-size distributions (BJH method; desorption isotherms) peaked at 24 nm and 38 nm for nanoporous membranes from LEL [14-28-14] and LEL [37-28-37], respectively, with calculated peak widths at half height equal to 3.5 nm and 11.1 nm (FIGS. 14 and 15). Specific surface areas calculated for LEL [14-28-14] and LEL [37-28-37] derived membranes were 70 and 96 m$^2$ g$^{-1}$, respectively.

Thin (~150 µm) films of the LEL samples were cast at 140° C. from tetralin for tensile testing evaluation as described above. These solvent cast films adopted the same disordered bicontinuous morphologies as the molded samples, as determined by SEM (FIGS. 16(a) and (b)). From the stress-strain curves of these samples (FIGS. 17(a) and (b)) the tensile toughness values were determined to be 1.54 and 4.91 MJ m$^{-3}$ for nanoporous versions of LEL [37-28-37] and LEL [14-28-14], respectively.

Temperature-induced pore collapse is an important attribute in battery separators for preventing thermal runaway and minimizing the potential for ignition upon fortuitous anode/cathode contact. The DSC analysis of the nanoporous LPE membranes (FIGS. 2 and 7(a)-(c)) gave high melting temperatures (T$_{m,PE}$≈130° C.) and levels of crystallinity (~60%) as compared to typical values for hPB Annealing the nanoporous LPE membranes at 150° C. for 5 min causes pore collapse, as confirmed by SEM analysis (FIGS. 18(a) and (b)).

Chemical resistance to strong acids was evaluated by submerging sections of the LEL [37-28-37] derived nanoporous samples into concentrated sulfuric (@ RT), hydrochloric (@ 50° C.) and nitric (@ RT) acids for 24 h. After rinsing and drying, >95% of the mass was retained in all cases. By SEM, there was little difference in the pore structure at the exposed surface (FIGS. 19(a)-(d)) in both the sulfuric and nitric acid cases. After the HCl treatment the porosity and pore size distribution were minimally affected according to nitrogen adsorption analysis (FIG. 20).

A number of embodiments of the invention have been described. Nevertheless, it will be understood that various modifications may be made without departing from the spirit and scope of the invention. Accordingly, other embodiments are within the scope of the following claims.

What is claimed is:

1. A process for preparing a polymer composite comprising:
    (a) reacting a hydroxyl-terminated, linear polyolefin polymer with a cyclic ester in the presence of a ring opening catalyst to form a block copolymer that includes at least one polyester block and at least one linear polyolefin block, the block copolymer being in the form of a nanostructured, bicontinuous composite comprising a continuous matrix phase and a second continuous phase, wherein the continuous matrix phase comprises the linear polyolefin block of the block copolymer, and the second continuous phase comprises the polyester block of the block copolymer; and
    (b) treating the bicontinuous composite to selectively remove the polyester block of the block copolymer to form a plurality of pores.

2. A process according to claim 1, wherein the pores have an average pore diameter of about 1 to about 500 nanometers.

3. A process according to claim 1, wherein the pores have an average pore diameter of about 10 to about 50 nanometers.

4. A process according to claim 1, comprising treating the bicontinuous composite with a chemical etchant.

5. A process according to claim 1, wherein the polyolefin is selected from the group consisting of polyethylene, polypropylene, and combinations thereof.

6. A process according to claim 5, wherein the polyolefin is polyethylene.

7. A process according to claim 1, wherein the cyclic ester is selected from the group consisting of D,L-lactide, glycolide, caprolactone, menthide, dihydrocarvide, and combinations thereof.

8. A process according to claim 7, wherein the cyclic ester is D,L-lactide and the polyester blocks are polylactide blocks.

9. A process according to claim 1, wherein the polyolefin is polyethylene, the cyclic ester is D,L-lactide, and the polyester block is a polylactide block.

* * * * *